(12) United States Patent
Teague, Jr.

(10) Patent No.: US 7,828,268 B2
(45) Date of Patent: Nov. 9, 2010

(54) CONDENSATE FREE VALVE HANDLE

(75) Inventor: Ralph Taggart Teague, Jr., Monroe, NC (US)

(73) Assignee: Conbraco Industries, Inc., Pageland, SC (US)

( * ) Notice: Subject to any disclaimer, the term of this patent is extended or adjusted under 35 U.S.C. 154(b) by 380 days.

(21) Appl. No.: 11/958,923

(22) Filed: Dec. 18, 2007

(65) Prior Publication Data
US 2009/0152483 A1 Jun. 18, 2009

(51) Int. Cl.
*F16K 51/00* (2006.01)
(52) U.S. Cl. .................. 251/288; 251/286; 251/315.01
(58) Field of Classification Search ................. 251/251, 251/284, 285, 286, 288, 315.01
See application file for complete search history.

(56) References Cited

U.S. PATENT DOCUMENTS

| | | | | |
|---|---|---|---|---|
| 3,964,514 A | * | 6/1976 | Manoogian et al. | 137/625.17 |
| 4,593,430 A | * | 6/1986 | Spangler et al. | 16/441 |
| 5,188,335 A | * | 2/1993 | Pettinaroli | 251/95 |
| 5,236,006 A | | 8/1993 | Platusich et al. | |
| 5,467,967 A | * | 11/1995 | Gillooly | 251/288 |
| 6,276,662 B1 | * | 8/2001 | Bugatti | 251/95 |

OTHER PUBLICATIONS

Cimberio Valve Co., Cim A921-Nylon Isolation Handle, http://www.cinberiovalve.com/html_pages/accessories/a921.html, Oct. 15, 2007, Cimberio Valve Company, 100 Quaker Lane, Malvern, PA 19355, USA.

* cited by examiner

*Primary Examiner*—John K Fristoe, Jr.
(74) *Attorney, Agent, or Firm*—Adams Intellectual Property Law

(57) ABSTRACT

The present invention provides a valve actuator for a valve that includes a cylindrical body that is thermally nonconductive and configured to engage a valve stem. A cylindrical adjuster is positioned coaxially with the body. A shaft extends through the adjuster and the adjuster is axially movable between a first position and a second position such that when the adjuster is in the first position a first engaging means engages a second engaging means thereby fixing the position of the adjuster relative to the body. When the adjuster is in the second position the adjuster is radially movable relative to the body. A spring is aligned with the shaft and configured to bias the adjuster toward the first position such that the first engaging means engages the second engaging means thereby fixing the position of the adjuster relative to the body.

20 Claims, 10 Drawing Sheets

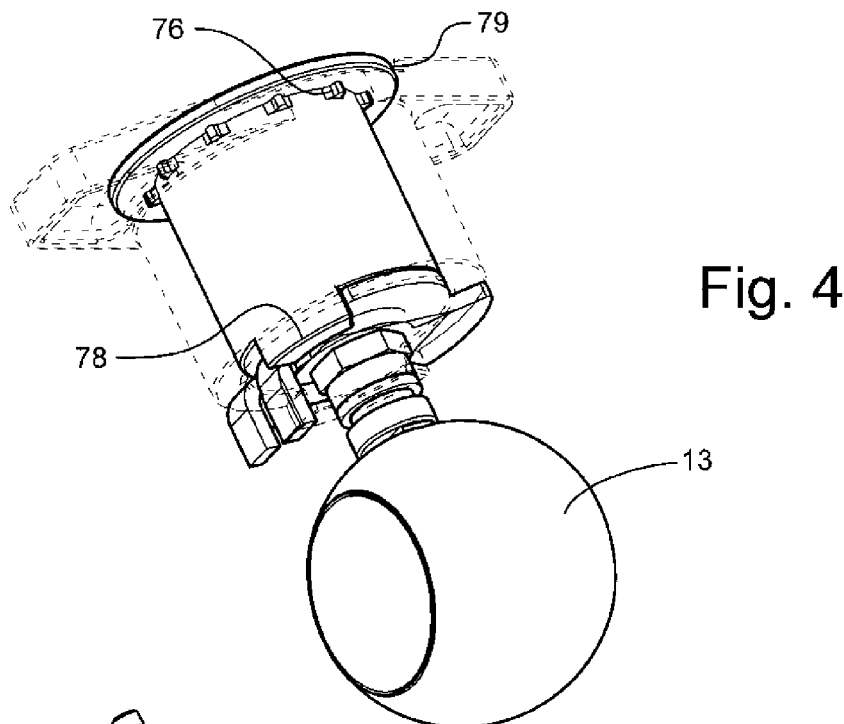
Fig. 4
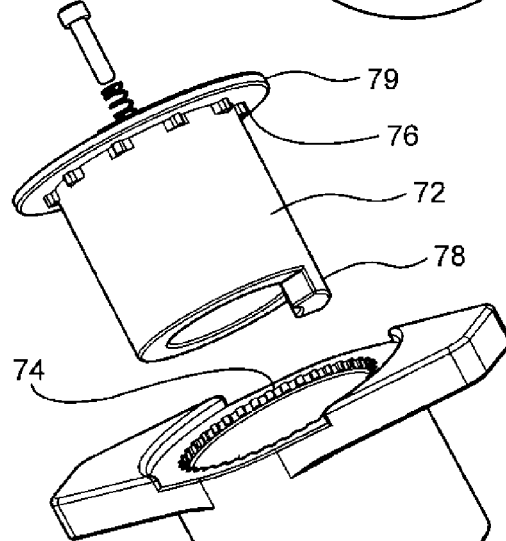
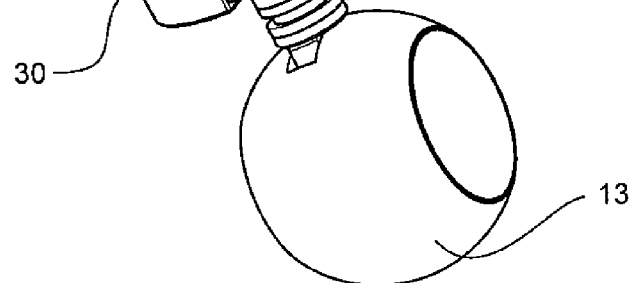
Fig. 5

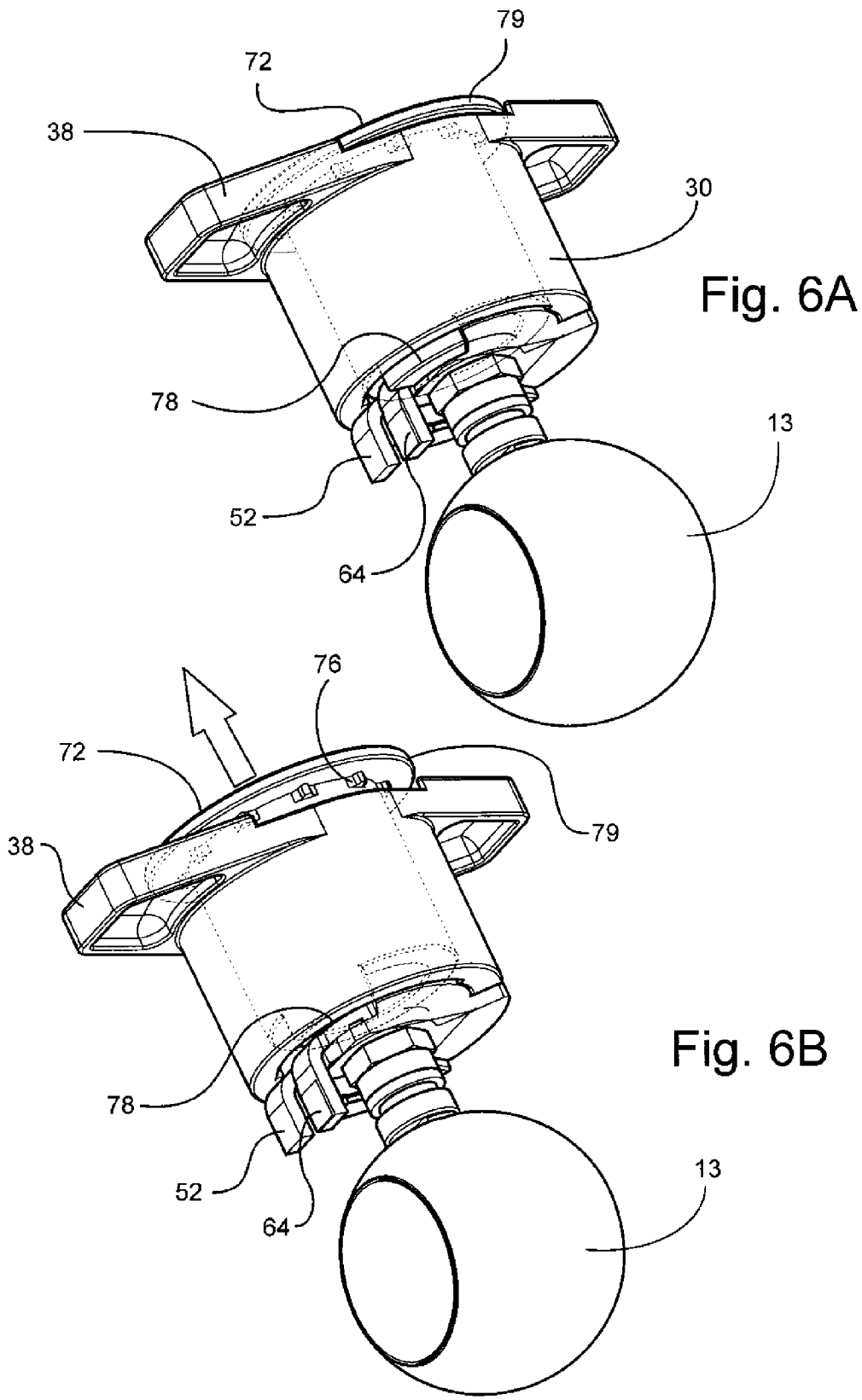

CONDENSATE FREE VALVE HANDLE

BACKGROUND OF THE INVENTION

This invention relates to thermally insulated valve actuators for use with valves used in condensate prone conditions, e.g., HVAC valves. Piping and valves used in HVAC systems frequently are thermally insulated with a wrapping material to minimize energy loss and to inhibit the formation of condensation. In this regard, condensation tends to occur with refrigeration/air conditioning systems, such as those employing chilled water.

Valve actuators are provided that extend through the thickness of the insulation to control the valves. On known systems, the extended actuator comprises a shaft that extends from the valve body to an exterior handle. Typically, an adjustable metallic stop on the actuator which is cooperative with a fixed stop on the valve body, i.e., a "memory stop," is provided to limit the valve to a predetermined range of motion. The memory stop can be adjusted by a tool such as a screw driver that is inserted through the insulation. The high thermal conductivity of metal extension components and of memory stop components results in cold temperatures at the exterior of the insulation, condensation, corrosion, and energy loss.

It is known to have an extension handle of a non conductive material, however, such known valves include plugs that must be removed to access the memory stop. In this regard, they also require tools for adjusting the memory step that are separate from the valve.

BRIEF SUMMARY OF THE INVENTION

Accordingly, there is a need to provide a valve actuator having a non-metallic valve extension and associated with a memory stop with an integral adjustment means that does not require separate tools to adjust.

It is an object of the present invention to provide a valve extension associated with a memory stop that does not require removal and replacement of a separate plug for adjustment of the memory stop.

It is another object of the present invention to provide a valve extension that is attached to the valve body via a central, spring-loaded shaft.

Therefore there is provided a valve actuator for a valve that includes a cylindrical body that is thermally nonconductive. A valve plate is positioned near one end of the body and configured to engage a valve stem. A cylindrical adjuster is positioned coaxially with the body. A shaft extends through the adjuster and the adjuster is axially movable between a first position and a second position such that when the adjuster is in the first position, a first engaging means engages a second engaging means thereby fixing the position of the adjuster relative to the body. When the adjuster is in the second position the adjuster is radially movable relative to the body. A spring is aligned with the shaft and configured to bias the adjuster toward the first position such that the first engaging means engages the second engaging means thereby fixing the position of the adjuster relative to the body.

In accordance with another embodiment of the invention, there is provided a valve actuator wherein when the adjuster is in the first position, the body is in cooperative engagement with a valve plate that is configured to engage the valve body.

In accordance with another embodiment of the invention, there is provided a valve actuator wherein the adjuster is configured to retain the body such that it is in cooperative engagement with the valve plate when the adjuster is in the second position.

In accordance with another embodiment of the invention, there is provided a valve actuator wherein the body is configured to be retained by a flange formed at one end of the adjuster.

In accordance with another embodiment of the invention, there is provided a valve actuator wherein the first and second means for engaging are interlocking splines.

In accordance with another embodiment of the invention, there is provided a valve actuator wherein the first means for engaging includes a plurality of indentations formed in the body and the second means for engaging includes a plurality of teeth configured to engage the indentations.

In accordance with another embodiment of the invention, there is provided a valve actuator wherein the adjuster is movable away from the valve to the first position.

In accordance with another embodiment of the invention, there is provided a valve actuator wherein the adjuster is movable toward the valve to the first position.

In accordance with another embodiment of the invention, there is provided a valve actuator wherein the body is configured to receive at least a portion of the adjuster.

In accordance with another embodiment of the invention, there is provided a valve actuator wherein the valve is a one quarter turn valve.

In accordance with another embodiment of the invention, there is provided a valve actuator wherein the valve is a ball valve.

According to yet another embodiment of the invention, there is provided a method for adjusting the degree of travel of a valve, comprising the steps of:

(a) providing a cylindrical body that is thermally nonconductive and has a first wall that defines a first space, a first engaging means formed on the body, and a valve plate positioned near one end of the body and configured to engage a valve stem; a cylindrical adjuster positioned coaxially with the body and having a second wall that defines a second space and a second engaging means formed on the adjuster for cooperative engagement with the first engaging means; a shaft that extends from the valve plate through the second space within the adjuster; the adjuster being axially movable between an operative position and a resetting position such that when the adjuster is in the operative position the first engaging means engages the second engaging means thereby fixing the position of the adjuster relative to the body and when the adjuster is in the resetting position, the adjuster is radially movable relative to the body; and a spring aligned with the shaft and configured to bias the adjuster toward the first position such that the first engaging means engages the second engaging means thereby fixing the position of the adjuster relative to the body;

(b) moving the adjuster axially from the operating position to the resetting position;

(c) turning the adjustment mechanism radially; and (d) returning the adjustment mechanism to the operating position.

BRIEF DESCRIPTION OF THE DRAWINGS

The subject matter that is regarded as the invention may be best understood by reference to the following description taken in conjunction with the accompanying drawing figures in which:

FIG. 4 is a perspective view of the valve actuator of the present invention attached to the ball portion of a conventional ball valve showing the adjuster portion of the actuator in solid lines and the handle portion of the actuator in dashed lines;

FIG. 5 is a perspective, partially exploded view of the valve actuator of the present invention attached to the ball portion of a conventional ball valve;

FIG. 6A is a perspective view of the valve actuator of the present invention attached to the ball portion of a conventional ball valve showing the adjuster in dashed lines and in a lowered first position relative to the handle;

FIG. 6B is a perspective view of the valve actuator of the present invention attached to the ball portion of a conventional ball valve showing the adjuster in dashed lines and in a raised second position relative to the handle;

DETAILED DESCRIPTION OF THE INVENTION

Figure 1A:
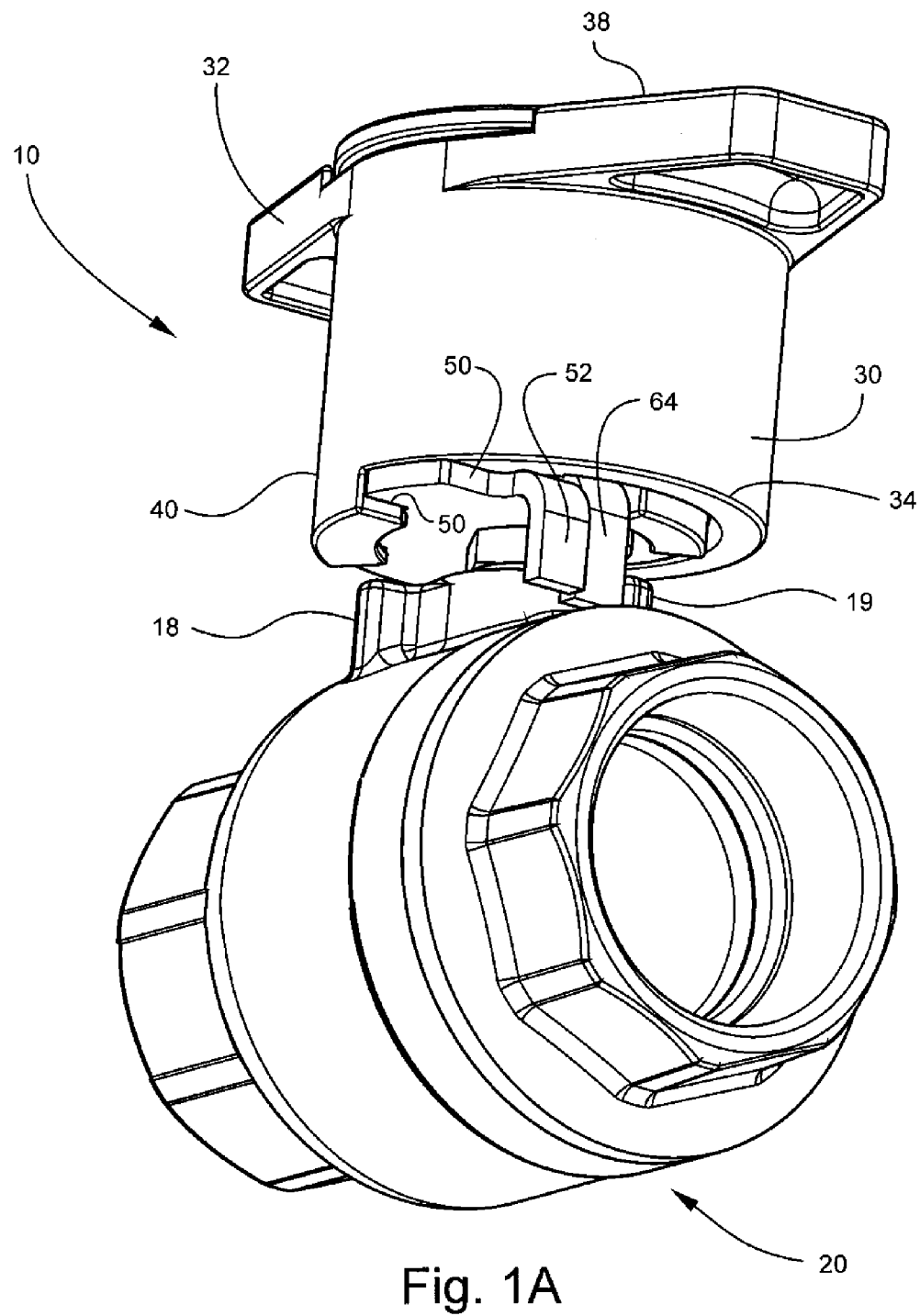
FIG. 1A is a perspective view of a valve actuator and valve, wherein the valve is in an open position.

Referring to the drawings wherein identical reference numerals denote the same elements throughout the various views, FIG. 1 shows a valve actuator 10 of the present invention attached to a conventional valve such as a ball valve 12 (FIGS. 1-5), as for HVAC systems. The valve 12 typically includes an inner valve element or plug, e.g., a ball 13 positioned within valve housing 14. A valve stem 16 extends from the valve element and through the housing 14 for rotational movement of the valve stem 16 and the ball 13. Laterally adjacent the valve stem 16 are spaced-apart first and second fixed stops 18 and 19 formed on the valve housing 14. In the illustrated embodiment, the first and second fixed stops 18 and 19 are positioned to limit the rotational travel of the ball 13 to 90 degrees, i.e., a quarter turn. It should be appreciated that the valve 12 can be any quarter turn valve such as a ball valve or a butterfly valve.

The valve actuator 10 is composed of several unique interfitting components including a generally-cylindrical, hollow projection body 30 having a central axis and first and second ends 32 and 34. At the first end 32 is a handle 38 which is preferably integrally formed with the remainder of body 30 and extends transversely to the central axis of body 30. Body 30 and handle 38 are open through the center thereof to form a central space 32 extending from the second end 34 through the first end 32 of the cylindrical body 30. A lug 40 is formed at the second end 34 of the body 30 and is generally parallel to and radially disposed from the central axis of body 30. In the illustrated embodiment, the body 30 and the handle 38 are formed of a polymeric material. It should be appreciated that the body 30 and the handle 38 can be formed of any suitable, thermally-insulating material.

Figure 3:
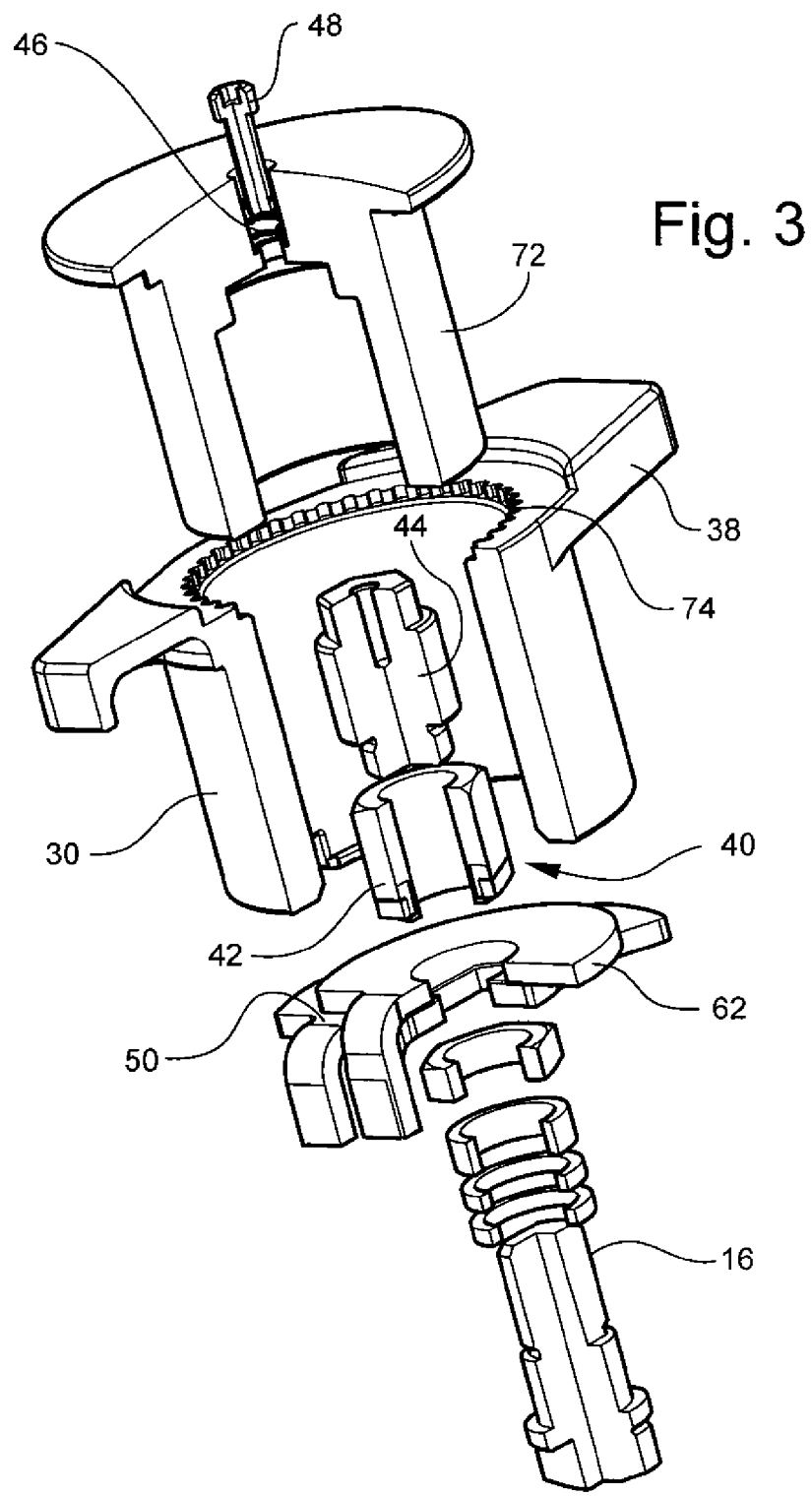
FIG. 3 is an exploded view of the valve actuator shown in FIG. 1.

Referring now to FIG. 3, lug 40 is configured to engage an aligned recess 51 that is formed in a valve plate 50. Plate 50 is preferably of metal such as stainless steel and includes a tab 52 that is configured to engage stop 18 of the valve 20 to limit motion of the actuator 10 in a first rotational direction. The valve plate 50 is formed to rotationally engage the valve stem 16 and is centered around the axis of valve stem 16. The plate 50 also defines a central opening 54, configured to receive and operatively engage valve stem 16. The end of valve stem 16 may protrude through plate 50 sufficiently to enable a stem extension nut 42 to be threaded thereto (FIG. 2), or, if desired, can simply extend through for rotational driving connection to plate 50.

An stem extension 40 is configured to operatively engage the valve stem 16 and extend within body 30 along the central axis to the first end 32 of body 30. The stem extension 40 includes a stem extension nut 42, a shaft 44, a spring 46, and a screw 48.

An adjustable stop plate 62 is positioned around the stem extension 40 and is retained near the valve plate 50 by the stem extension nut 42. The adjustable stop plate 62 generally defines a plane and has a tab 64 extending generally perpendicularly to the plane and generally parallel with the central axis of the body 30 toward the second end 34 of the body 30. The tab 64 is configured to extend through an open arcuate area 50' defined in plate 50 and to engage stop 19 of the valve 20 to limit motion of the ball 13 in a second rotational direction.

The tab 64 of the adjustable stop plate 62, is configured to cooperatively operate with the tab 52 of the plate 50 to limit the travel of the ball between a first and second position. When the ball 13 is in the first position, the valve 20 is fully closed and the tab 52 of plate 50 is engaged with stop 19. When the ball 13 is in the second position, the valve is fully open. As will be discussed further below, the adjustable stop plate is repositionable between first and second stop positions relative to the plate 50. When the adjustable plate is in the first stop position, the rotational travel of the ball 13 between the first position and the second position is not limited. When the adjustable stop plate is in the second stop position, rotational travel of the ball 13 is restricted such that the valve 20 can not be opened. When the adjustable stop plate is between the first stop position and the second stop position, the travel of the ball 13 is limited such that the valve can not travel completely to the second position and thus can only be partially opened. In this manner, adjustable stop plate 62 can function as a memory stop.

As shown in FIGS. 6A and 6B, a cylindrical adjuster 72 is positioned coaxially within the body 34. Cylindrical adjuster 72 is generally tubular and defines a second space that is configured to receive the shaft extension 40. In the embodiment shown, the adjuster 72 is open at the end positioned near the valve 20 at the second end 34 of the body 34 and is covered at the end positioned near the first end of the body 34. The body 34 has a first engaging means 74 formed at the first end 32 on an interior surface. The adjuster 72 has a second engaging means formed on an exterior surface at the covered end for cooperative engagement with the first engaging means 74. The first and second engaging means can be interlocking teeth, splines, keys, keyways, threads, notches, indents, protrusions or the like that are configured to limit relative motion between the adjuster 72 and the body 30.

The open end of the adjuster 72 is configured to abut the adjustable stop plate 62. A lug 78 is formed on the at the open end of the adjuster 72 and is configured to be received by an opening 65 formed in the adjustable stop plate 62. The adjuster 72 is retained on the extension shaft 44 by a screw 48 that passes through and opening in the covered end of the adjuster 72. The adjuster 72 is biased toward the adjustable stop plate 62 by the spring 46 of the extension shaft 44. In one embodiment, body 30 interacts with a lip 79 formed on the covered end of the adjuster 72 such that the body 30 is retained in position around the extension shaft 30 and biased toward valve plate 50.

The adjuster 72 is axially movable between an operative first position and a resetting second position. In this regard, the first engaging means 74 engages the second engaging means 76 when the adjuster is in the operative position, and the adjuster 72 is rotatable relative to the body 30 when the adjuster is in the resetting position. The adjustable stop plate 62 is rotatable relative to the body 30 due to the interaction of the stop plate 62 and the lug 78 of the adjuster 72 when the adjuster is in the resetting position. In this manner, tab 64 of stop plate 62 can be moved in relation to valve plate 50 such that its position is reset. When the adjuster 72 is in the engaged position, tab 64 of stop plate 62 can not be moved in relation to valve plate 50 and the actuator 10 is operable to move the ball 13 of valve 20.

The present invention can be better understood by its operation. In a normal operating mode the actuator 10 transmits rotation force to the valve stem 16 such that the valve 20 can be rotationally moved, i.e., opened and closed. The valve 20 is shown in the normal operating mode in FIG. 1 and the adjuster is in the operative, engaged, position. As indicated above, the degree of rotational movement of the ball 13 of the valve 20 is limited by the interaction of the tab 52 of the plate 50 and the tab 64 of the adjustable plate 62 with the first and second fixed stops 18 and 19. The relative positions of the tab 52 and the tab 64, and the degree to which the valve 20 can be opened, can be adjusted by movement of the adjuster 72 according to the following method.

Figure 1B:
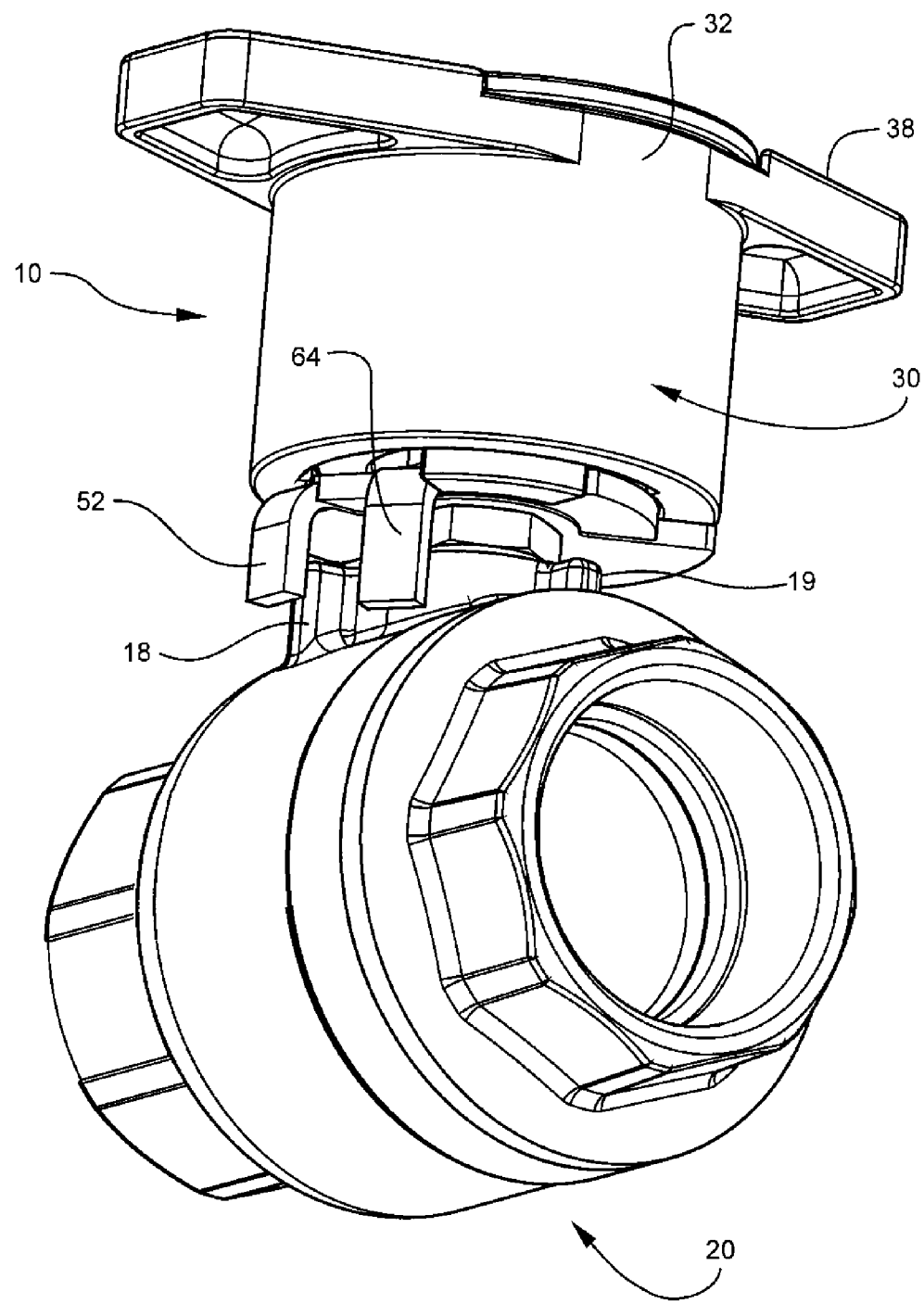
FIG. 1B is a perspective view of a valve actuator and valve, wherein the valve is in a closed position.
Figure 2:
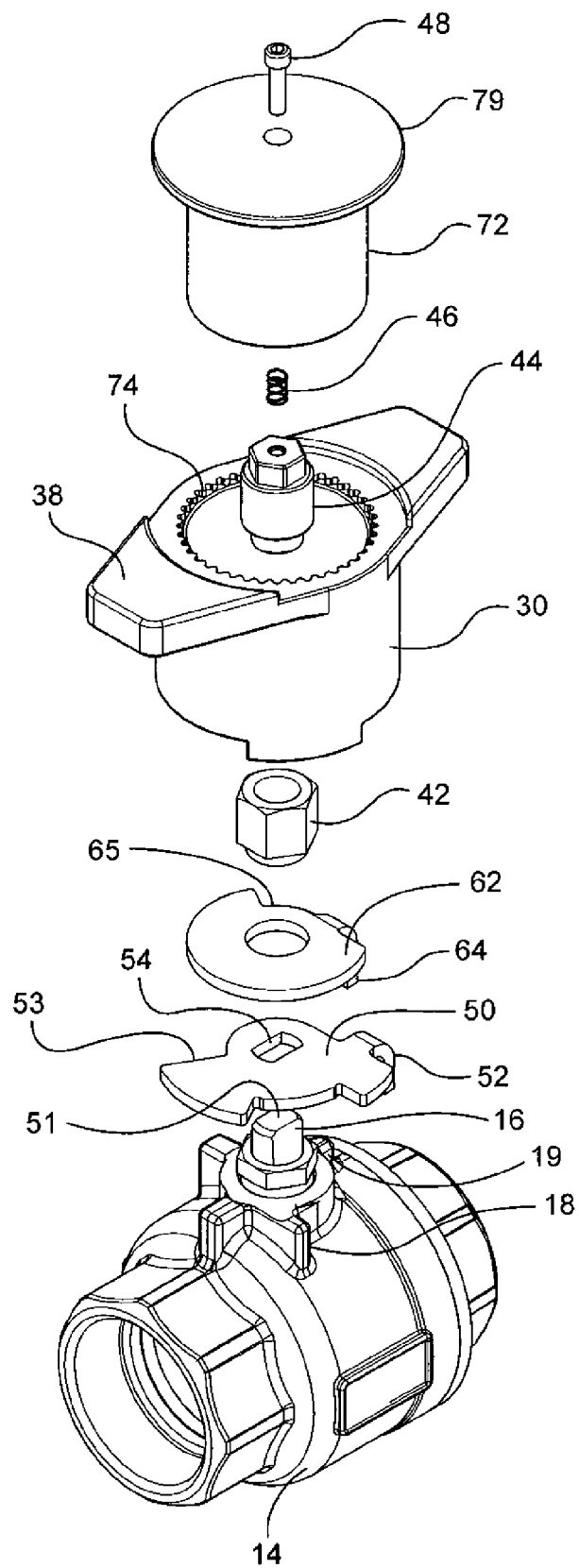
FIG. 2 is an exploded view of a valve actuator of the present invention with a valve.
Figure 7A:
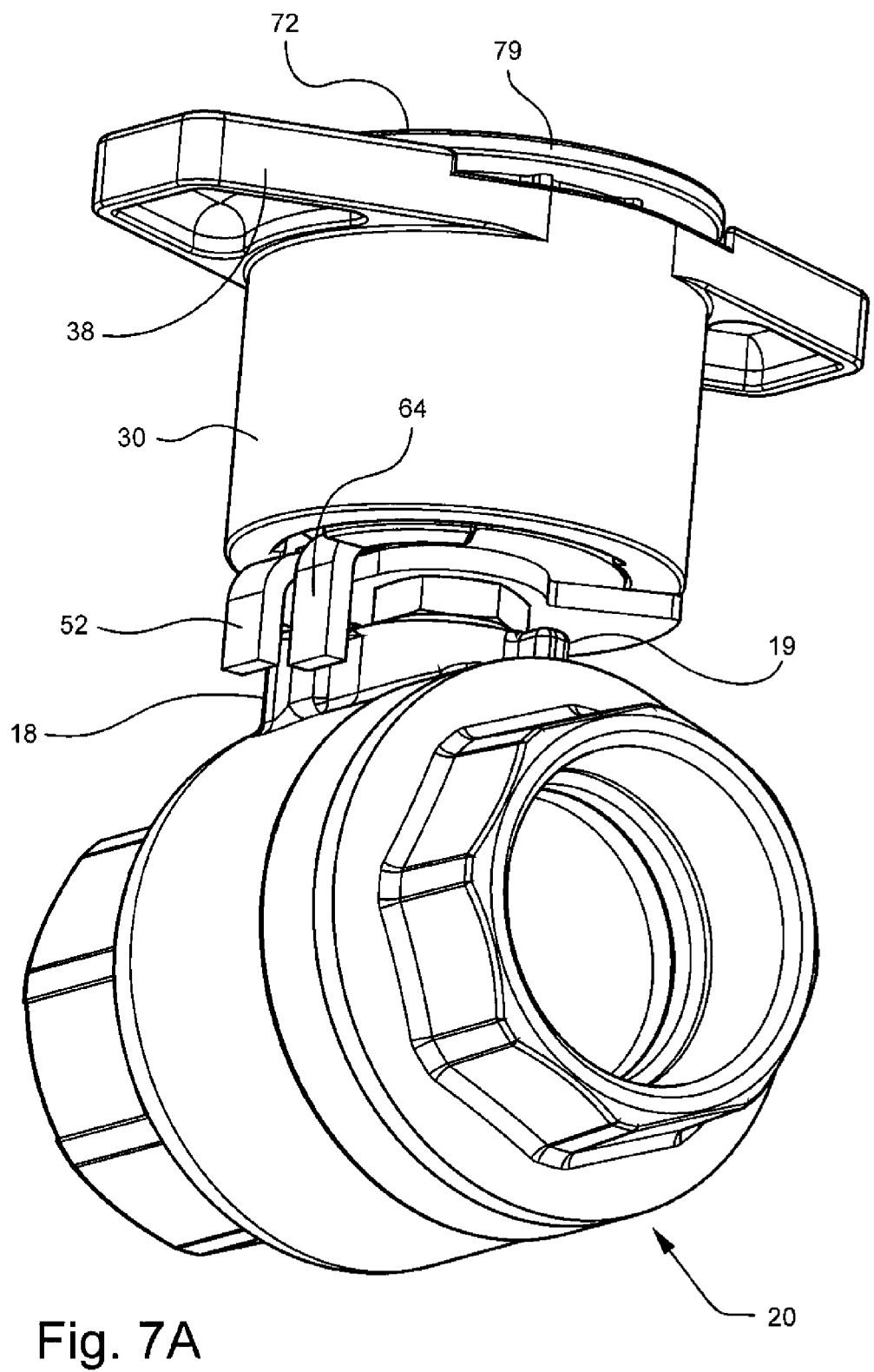
FIG. 7A is a perspective view of the valve actuator of the present invention attached to a conventional ball valve and in the raised second position and not rotated relative to the body.
Figure 7B:
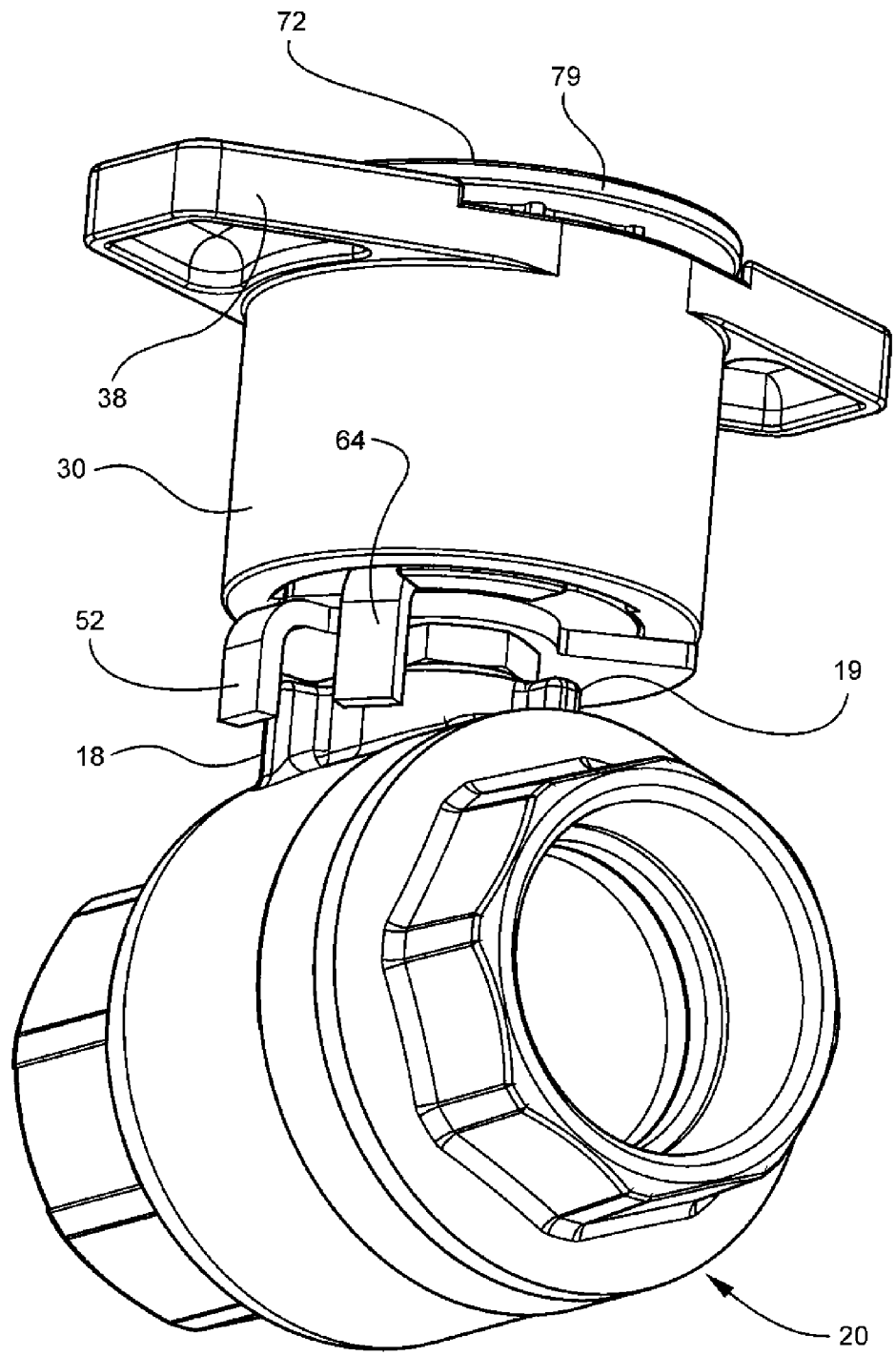
FIG. 7B is a perspective view of the valve actuator and the ball valve shown in FIG. 7A, wherein the adjuster is rotated relative to the body.
Figure 7C:
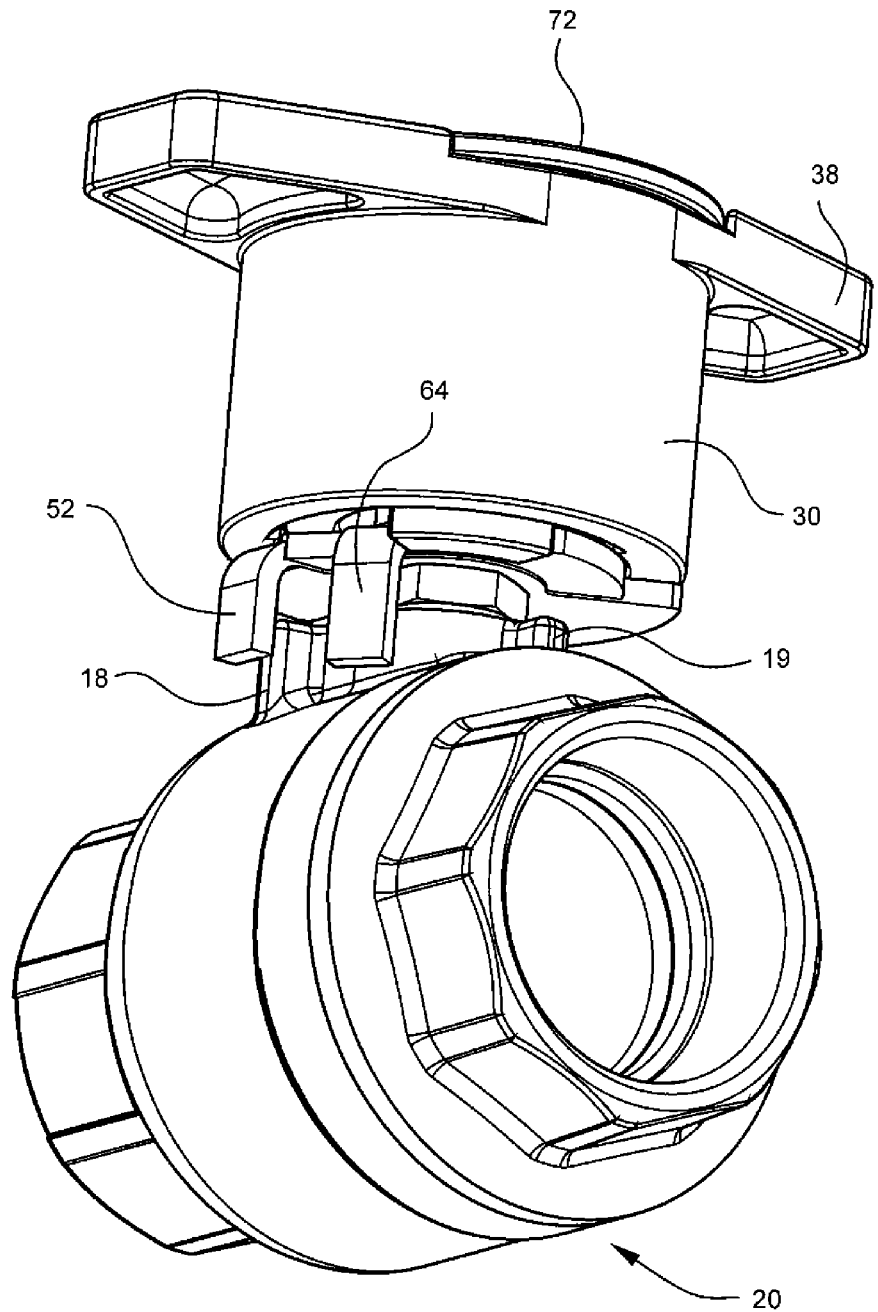
FIG. 7C is a perspective view of the valve actuator and the ball valve shown in FIG. 7B, wherein the adjuster is in the lowered first position.
Figure 7D:
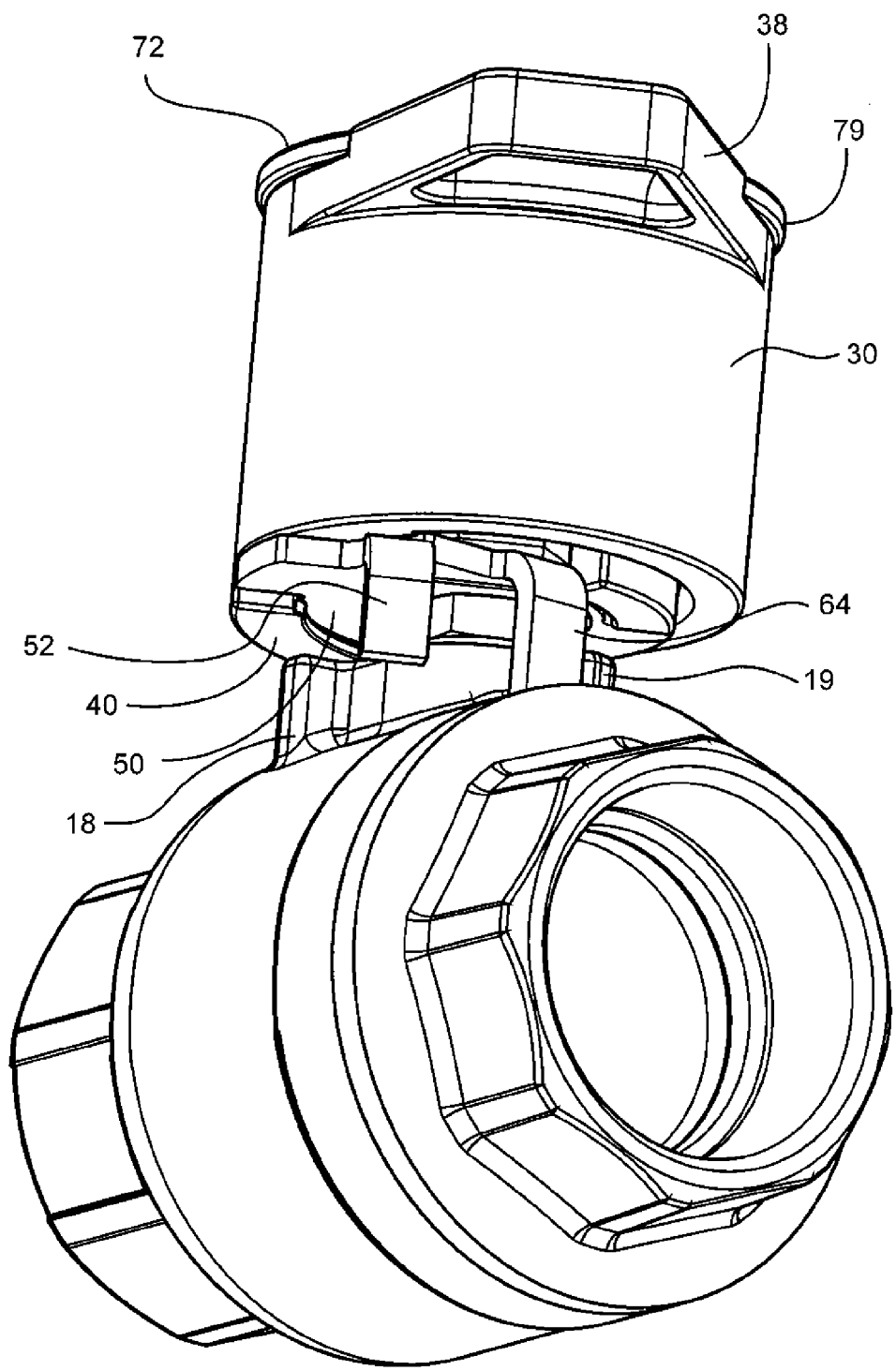
FIG. 7D is a perspective view of the valve actuator and valve shown in FIG. 7C, wherein the valve is open to the limit defined by the actuator.

For example, as shown in FIG. 1, the valve 20 is movable between the fully closed position (as shown in FIGS. 1B and 7A) and the fully open position (as shown in FIG. 1A). To reset the degree to which the valve 20 can be opened, the adjuster is moved axially away from the operating position as shown in FIG. 6A, to the resetting position as shown in FIG. 6B and FIG. 7A. The adjuster 72 is then rotated to a position such that tab 64 of the adjuster plate 62 is offset from the tab 52 of the valve plate 50. In FIGS. 7B and 7C, the degree of offset is shown about one third of the possible ¼ turn. The adjuster is then moved back to the operating position as shown in FIG. 7C with the degree of offset remaining at about one third. The valve 20 is now operable and the degree of travel of the ball 13, and thus the amount that the valve can be opened, is limited to about two thirds of full open.

Thus the present invention provides an extended valve actuator that is operable to reduce the amount of condensation that can form on the valve handle. In addition, the actuator 10 of the present invention provides memory stop capabilities that are easily reset, or adjusted, without additional tools. In one embodiment, the main components of the actuator are retained in position by the extension shaft 44 thus reducing the amount of additional fasteners, such as screws, that are used in the fabrication of the adjuster 72.

The foregoing has described a condensate resistant valve actuator having an easily resettable memory stop feature. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

I claim:

1. A valve actuator for a valve, comprising;
    (a) a cylindrical body that is thermally nonconductive and has a first wall that defines a first space and a first engaging means formed on a first end of the body;
    (b) a cylindrical adjuster positioned coaxially with the body and having a second wall that defines a second space and a second engaging means formed on the adjuster for cooperative engagement with the first engaging means;
    (d) a shaft that extends from a valve stem through the second space within the adjuster, wherein the adjuster is retained on the shaft;
    (e) the adjuster being axially movable between a first position and a second position such that when the adjuster is in the first position the first engaging means engages the second engaging means thereby fixing the position of the adjuster relative to the body and when the adjuster is in the second position the adjuster is radially movable relative to the body; and
    (f) a spring aligned with the shaft biasing the adjuster toward the first position such that the first engaging means engages the second engaging means thereby fixing the position of the adjuster relative to the body.

2. A valve actuator according to claim 1, wherein when the adjuster is in the first position, the body is in cooperative engagement with a valve plate that is configured to engage the valve body.

3. A valve actuator according to claim 2, wherein the adjuster is configured to retain the body such that it is in cooperative engagement with the valve plate when the adjuster is in the second position.

4. A valve actuator according to claim 3, wherein the body is configured to be retained by a flange formed at one end of the adjuster.

5. A valve actuator according to claim 1, wherein the first and second means for engaging are interlocking splines.

6. A valve actuator according to claim 1, wherein the first means for engaging includes a plurality of indentations formed in the body and the second means for engaging includes a plurality of teeth configured to engage the indentations.

7. A valve actuator according to claim 1, wherein the adjuster is movable away from the valve to the first position.

8. A valve actuator according to claim 1, wherein the adjuster is movable toward the valve to the first position.

9. A valve actuator according to claim 1, wherein the body is configured to receive at least a portion of the adjuster.

10. A valve actuator according to claim 1, wherein the valve is a one quarter turn valve.

11. A valve actuator according to claim 1, wherein the valve is a ball valve.

12. A method for adjusting the degree of travel of a valve, comprising the steps of:
    (a) providing a cylindrical body that is thermally nonconductive and has a first wall that defines a first space and a first engaging means formed on a first end of the body; a cylindrical adjuster positioned coaxially with the body and having a second wall that defines a second space and a second engaging means formed on the adjuster for cooperative engagement with the first engaging means; a shaft that extends from the valve plate through the second space within the adjuster, wherein the adjuster is retained on the shaft; the adjuster being axially movable between a operative position and a resetting position such that when the adjuster is in the operative position the first engaging means engages the second engaging means thereby fixing the position of the adjuster relative to the body and when the adjuster is in the resetting position the adjuster is radially movable relative to the body; and a spring aligned with the shaft biasing the adjuster toward the first position such that the first engaging means engages the second engaging means thereby fixing the position of the adjuster relative to the body;

(b) moving the adjuster axially from the operating position to the resetting position;

(c) turning the adjuster radially; and (d) returning the adjuster to the operating position.

13. A method for adjusting the degree of travel of a valve according to claim 12, wherein when the adjuster is in the first position, the body is in cooperative engagement with a valve plate that is configured to engage the valve body.

14. A method for adjusting the degree of travel of a valve according to claim 12, wherein the adjuster is configured to retain the body such that it is in cooperative engagement with the valve plate when the adjuster is in the second position.

15. A method for adjusting the degree of travel of a valve according to claim 12, wherein the body is configured to be retained by a flange formed at one end of the adjuster.

16. A method for adjusting the degree of travel of a valve according to claim 12, wherein the first and second means for engaging are interlocking splines.

17. A method for adjusting the degree of travel of a valve according to claim 12, wherein the adjuster is movable away from the valve to the first position.

18. A method for adjusting the degree of travel of a valve according to claim 12, wherein the adjuster is movable toward the valve to the first position.

19. A method for adjusting the degree of travel of a valve according to claim 12, wherein the body is configured to receive at least a portion of the adjuster.

20. A valve actuator according to claim 12, wherein the valve is a one quarter turn valve.

* * * * *